(12) United States Patent
   Hijikata

(10) Patent No.: US 9,388,000 B2
(45) Date of Patent: Jul. 12, 2016

(54) SPACING MECHANISM FOR SPACING TWO MEMBERS, AND A FIXING DEVICE SHEET FEEDING-CONVEYING DEVICE AND IMAGE FORMING APPARATUS INCORPORATING SAME

(71) Applicant: CANON KABUSHIKI KAISHA, Tokyo (JP)

(72) Inventor: Shunsuke Hijikata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/608,527

(22) Filed: Jan. 29, 2015

(65) Prior Publication Data

US 2015/0217953 A1    Aug. 6, 2015

(30) Foreign Application Priority Data

Jan. 31, 2014   (JP) ................. 2014-016893

(51) Int. Cl.

| | |
|---|---|
| *G03G 15/16* | (2006.01) |
| *B65H 3/06* | (2006.01) |
| *G03G 15/20* | (2006.01) |
| *F16H 37/12* | (2006.01) |
| *B65H 1/08* | (2006.01) |
| *B65H 5/06* | (2006.01) |

(52) U.S. Cl.
   CPC ............... *B65H 3/0669* (2013.01); *B65H 1/08* (2013.01); *B65H 5/06* (2013.01); *F16H 37/124* (2013.01); *G03G 15/2017* (2013.01); *G03G 15/2032* (2013.01); *G03G 15/2064* (2013.01); *Y10T 74/18056* (2015.01)

(58) Field of Classification Search
   CPC .......... G03G 15/2067; G03G 15/2064; G03G 15/2032; G03G 15/2017; G03G 21/1857; B65H 3/0669; B65H 1/08; B65H 5/06; F16H 37/124; Y10T 74/18056
   USPC ........................................................ 399/122
   See application file for complete search history.

(56) References Cited

U.S. PATENT DOCUMENTS

| | | | | |
|---|---|---|---|---|
| 5,961,112 | A | * 10/1999 | Kim ..................... | B65H 3/0669 271/10.05 |
| 8,538,307 | B2 | 9/2013 | Hisano | |
| 2007/0019977 | A1* | 1/2007 | Sawamura ......... | G03G 15/2064 399/67 |
| 2009/0324307 | A1* | 12/2009 | Tsukamoto ........ | G03G 15/2032 399/328 |

FOREIGN PATENT DOCUMENTS

| | | |
|---|---|---|
| JP | 2003-280308 A | 10/2003 |
| JP | 2007-3599 A | 1/2007 |
| JP | 2007-24950 A | 2/2007 |

(Continued)

*Primary Examiner* — Billy Lactaoen
(74) *Attorney, Agent, or Firm* — Fitzpatrick, Cella, Harper & Scinto

(57) ABSTRACT

A spacing mechanism includes a first member; a second member; a rotation shaft; an urged member supported by the second member; an urging member for urging the urged member against an urging force toward the first member to space the second member from the first member, a first gear and a load receiving portion rotatable integrally with the urging member; a second gear engaged with the first gear; an elastic member having one end fixed to the second member and another end contacted to the load receiving portion. When the shaft rotates from a predetermined rotational phase and the urged member is released from the urging member, the elastic member applies a load to the second member in a direction in which the second member is rotated.

14 Claims, 10 Drawing Sheets

(56) References Cited

FOREIGN PATENT DOCUMENTS

| | | |
|---|---|---|
| JP | 2010-48965 A | 3/2010 |
| JP | 2010-271587 A | 12/2010 |
| JP | 2011-59260 A | 3/2011 |
| JP | 2011-169947 A | 9/2011 |
| JP | 2014-48597 A | 3/2014 |

\* cited by examiner

SPACING MECHANISM FOR SPACING TWO MEMBERS, AND A FIXING DEVICE SHEET FEEDING-CONVEYING DEVICE AND IMAGE FORMING APPARATUS INCORPORATING SAME

FIELD OF THE INVENTION AND RELATED ART

The present invention relates to a separation mechanism, a fixing apparatus (device), a sheet feeding-conveying apparatus (device), and an image forming apparatus.

An image forming apparatus, such as a copying machine, a printer, and the like, which uses an electrophotographic image forming method, has various sections in which a combination of a cam and a cam follower is used to place a pair of components in contact with each other, or separate the pair of components from each other. For example, in the sheet feeding-conveying device of an image forming apparatus, a combination of a cam and a cam follower is used to place a feed roller for conveying a sheet of recording paper, in contact with a sheet of recording paper in the sheet holding portion of the image forming apparatus, in which sheets of recording paper are held in layers, or separating the feed roller from the sheet in the sheet holding portion. Further, in the fixing device in an image forming apparatus, another combination of a cam and a cam follower is used to place a heat roller and a pressure roller in contact with each other, or separate the heat roller and pressure roller from each other.

A mechanism, such as those described above, which employs a combination of a cam and a cam follower suffers from a phenomenon referred to as "unintended cam acceleration", which results in the following problem. Unintended cam acceleration is such a phenomenon that when the relationship, in terms of rotational phase, between a cam and a cam follower is specific, such a rotational force that pushes the gear (cam) in the rotational direction of the gear (cam) is generated. Thus, the gear (cam) which is being rotated by a preset amount of rotational force generated by a motor, temporarily rotates faster than the preset speed at which it is to be rotated by the motor.

This unintended cam acceleration sometimes results in the generation of collisional noises. More concretely, in the case of some sheet feeding devices, the peripheral surface of their cam is provided with a recess to cause their cam follower to fit into the recess to control the cam in rotational phase. Thus, if the above described unintended cam acceleration occurs at the same time as the cam follower fits into the recess of the cam, collisional noises occur. Further, in the case of a fixing device, the unintended cam acceleration occurs when the heat roller, and the pressure roller which remained separated from the heat roller, are placed in contact with each other. Thus, the heat roller and pressure roller are suddenly pressed upon each other. Consequently, collisional noises sometime occur.

One of the solutions to the above described problem is disclosed in Japanese Laid-open Patent Application 2007-3599. According to this patent application, a load braking force is applied to the cam with the use of a damper to reduce the speed of the unintended cam acceleration, in order to minimize the collisional noises. Referring to FIG. 10, which shows the structure of the conventional fixing device disclosed in the abovementioned patent application document, the fixing device is provided with a mechanism for placing its fixation roller 2 and pressure roller 4 in contact with, or separate from, each other. The pressure roller 4 is supported by a pressure roller supporting member 5, and remains pressed upon the fixation roller 2 by a pair of compression springs 6. The pressure roller supporting member 5 is provided with a slave roller 36 (cam follower), which is in contact with a cam 34. Further, there is a slave roller 35, which is attached to the same shaft as the cam 34. The slave roller 35 transmits the driving force from a motor 24 to the cam 34.

FIG. 11(a) shows the state of the fixing device structured as described above, in which fixation roller 2 and pressure roller 4 are in contact with each other, and FIG. 11(b) shows the state of the fixing device, in which the fixation roller 2 and pressure roller 4 remain separated from each other. FIG. 11(c) shows the state of the fixing device, during a period in which the pressure roller 4 which was remaining separated from the fixation roller 2 comes into contact with the fixation roller 2. During this period, a damper 26 is in action. When the fixing device is in the state shown in FIG. 11(a), the toothless portion of a partially toothless gear 25 faces a slave gear 27 which is coaxially attached to the shaft of the damper 26. That is, the partially toothless gear 25 is not in mesh with the slave gear 27. Therefore, the damper 26 is inactive. However, as the state of the fixing device changes from the one shown in FIG. 11(b) to the one shown in FIG. 11(c), the toothed portion of the partially toothless gear 25 meshes with the slave gear 27, putting thereby the damper 26 into action. Because the fixing device is structured as described above, the damper 26 comes into action to minimize the collisional noises attributable to the collision caused between the pressure roller 4 and fixation roller 2 by the unintended cam acceleration.

However, the above described conventional mechanism for placing the pressure roller 4 and fixation roller 2 in contact with, or separate from, each other suffers from the following problem. As a cam is rotated, such a torque that works in the direction to accelerate the cam is generated at the point of contact between the cam and cam follower, whereby the gear which is in connection to the cam is increased in rotational speed, and unintended cam acceleration may occur. In the past, a damper was used to prevent the cam from being accelerated. The conventional damper-based mechanism cannot completely eliminate the unintended cam acceleration. That is, the cam is briefly accelerated sometimes. Thus, in a case where the angle by which the cam rotates from the time when the cam begins to be unintentionally accelerated to the time when the cam is stopped is small, the cam sometimes fails to be reduced in speed. Moreover, the damper used to prevent the cam from being unintentionally accelerated is changed in the amount of braking (damping) force, by the change in ambience and/or its cumulative usage. Further, cumulative use of a product which employs a frictional damper may change the braking (damping) force (torque).

SUMMARY OF THE INVENTION

The primary object of the present invention made in consideration of the above described problem is to minimize the collisional noises which occur when a cam and a cam follower are abruptly placed in contact with each other, or separated from each other.

According to an aspect of the present invention, there is provided a spacing mechanism comprising a first member; a second member urged toward said first member; a rotation shaft rotatable by a driving force from a driving source; an urged member supported by said second member; an urging member for receiving the driving force said rotation shaft to rotate, said urging member urging said urged member against an urging force toward said first member to space said second member from said first member, in a state that said rotation shaft is at a predetermined rotational phase; a first gear and a load receiving portion which are rotatable integrally with said urging member; a second gear engaged with said first gear to be driven by said first gear; and an elastic member having one end portion fixed to a fixed portion of said second member and another end portion contacted to said load receiving portion, wherein when said rotation shaft rotates from the predetermined rotational phase and said urged member is released from said urging member, said elastic member applies a load to said second member in a direction in which said second member rotates by receiving the driving force.

According to another aspect of the present invention, there is provided a fixing device for pressing a recording material to fix an image on a recording material, said fixing device comprising a first rotatable member; a second rotatable member for cooperating with said first rotatable member to form a nip for nipping the recording material, said second rotatable member being urged to said first rotatable member to be rotated by said first rotatable member; a rotation shaft rotatable by a driving force from a driving source; an urged member supported by said second rotatable member; an urging member for receiving the driving force said rotation shaft to rotate, said urging member urging said urged member against an urging force toward said first rotatable member to space said second rotatable member from said first rotatable member, in a state that said rotation shaft is at a predetermined rotational phase; a first gear and a load receiving portion which are rotatable integrally with said urging member; a second gear engaged with said first gear to be driven by said first gear; and an elastic member having one end portion fixed to a fixed portion of said second rotatable member and another end portion contacted to said load receiving portion, wherein when said rotation shaft rotates from the predetermined rotational phase and said urged member is released from said urging member, said elastic member applies a load to said second rotatable member in a direction in which said second rotatable member rotates by receiving the driving force.

According to a further aspect of the present invention, there is provided a feeding device for feeding a recording material, said device comprising a rotatable feeding member for feeding the recording material; a supporting member for supporting the recording material, said supporting member being urged toward said feeding member to feed the recording material by rotation of said feeding member in a state that the recording material is nipped between said supporting member and said feeding member; a rotation shaft rotatable by a driving force from a driving source; an urged member supported by said second member; an urging member for receiving the driving force said rotation shaft to rotate, said urging member urging said urged member against an urging force toward said feeding member to move said supporting member away from said feeding member, in a state that said rotation shaft is at a predetermined rotational phase; a first gear and a load receiving portion which are rotatable integrally with said urging member; a second gear engaged with said first gear to be driven by said first gear; and an elastic member having one end portion fixed to a fixed portion of said supporting member and another end portion contacted to said load receiving portion, wherein when said rotation shaft rotates from the predetermined rotational phase and said urged member is released from said urging member, said elastic member applies a load to said feeding member in a direction in which said feeding member rotates by receiving the driving force.

Further features of the present invention will become apparent from the following description of exemplary embodiments with reference to the attached drawings.

DESCRIPTION OF THE PREFERRED EMBODIMENTS

Hereinafter, the present invention is concretely described with reference to a couple of embodiments of the present invention, and appended drawings. The measurements, materials, and shapes of the structural components, and also, the positional relationship among the components, disclosed in the following embodiments of the present invention, are not intended to limit the present invention in scope. That is, they are to be altered as necessary according to the structure of an apparatus to which the present invention is applied, and various conditions under which the apparatus is operated.

EMBODIMENTS

Figure 1:
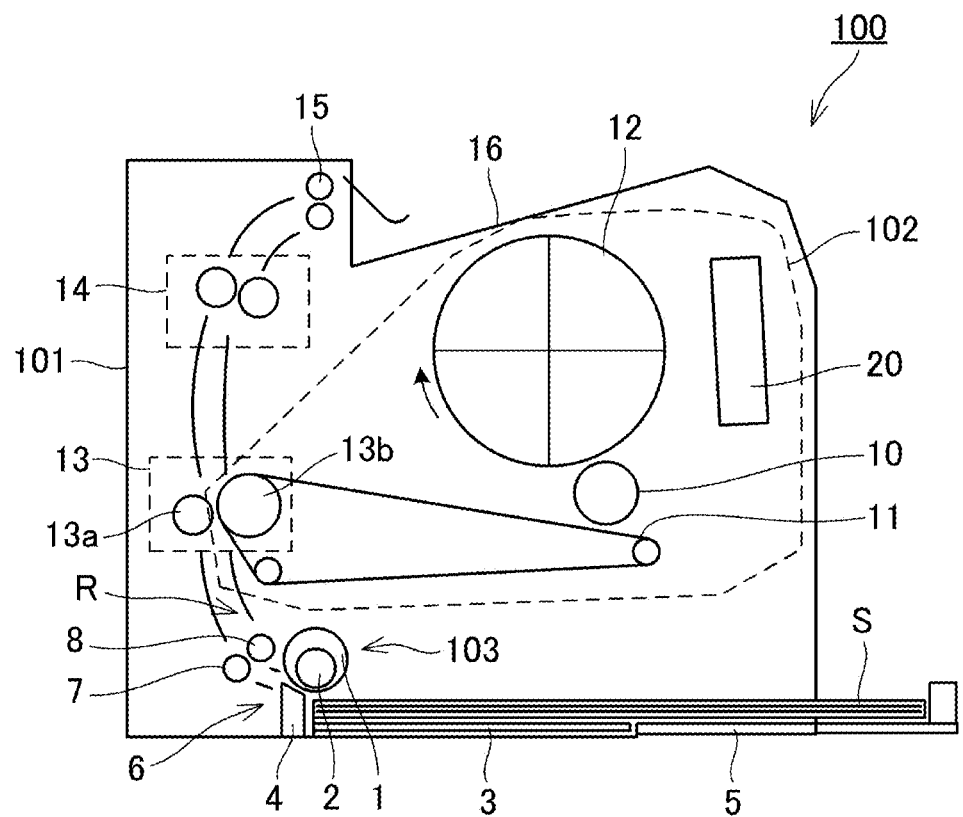
FIG. 1 is a schematic sectional view of the image forming apparatus in the first embodiment of the present invention, and shows the general structure of the apparatus.

The separation mechanism in this embodiment is employable by an image forming apparatus such as a copying machine, a printer, etc., which uses an electrophotographic image forming method. To begin with, referring to FIG. 1, an image forming apparatus by which the separation mechanism in this embodiment is employed is described about its general structure. FIG. 1 is a schematic sectional view of the image forming apparatus in these embodiments, and shows the general structure of the apparatus.

Referring to FIG. 1, the image forming apparatus in this embodiment is a laser printer 100. It is made up of a main assembly 101 (which hereafter may be referred to as "printer main assembly"), an image forming section 102, and a sheet feeding-conveying device 103 which feeds and conveys a sheet S of recording medium.

The image forming section 102 has a photosensitive drum 10, a rotary developing device 12, a laser-based optical exposing system 20, etc. The rotary developing device 12 has four monochromatic developing devices, more specifically, a black color developing device, a yellow color developing device, a magenta color developing device, and a cyan color developing device. Each developing device employs its own toner cartridge. The rotary developing device 12 can be rotated in the clockwise direction indicated by an arrow mark in FIG. 1, so that any of the four developing devices can be moved into a development position in which it opposes the photosensitive drum 10.

Further, the image forming section 102 is provided with: an endless transfer belt 11, onto which four monochromatic toner images, different in color, are transferred in layers after their formation on the photosensitive drum 10; and a secondary transfer roller 13a which forms the secondary transferring section for transferring the toner image (made up of layered four monochromatic toner images) from the transfer belt 11 onto a sheet S of recording medium. There is also provided on the downstream side of the secondary transferring section 13, a fixing device 14 for fixing the unfixed image on the sheet S (recording medium), a pair of discharge rollers 15 for discharging the sheet S out of the printer main assembly 101 after the fixation of the image, etc.

As image formation signals are outputted from un unshown controlling device with which the printer main assembly 101 is provided, an optical image of the first color, which is created by converting the information of the image to be formed into optical signals, is projected upon the peripheral surface of the photosensitive drum 10, from the laser-based optical exposing system 20. By the way, the peripheral surface of the photosensitive drum 10 is charged before it is exposed to the optical image. Thus, as the optical image is projected upon the peripheral surface of the photosensitive drum 10, an electrostatic latent image is formed on the peripheral surface of the photosensitive drum 10.

Then, the electrostatic latent image on the photosensitive drum 10 is developed by one of the four developing devices in the rotary developing device 12. As a result, a toner image of the first color is formed on the photosensitive drum 10. Then, the toner image on the peripheral surface of the photosensitive drum 10 is transferred onto the transfer belt 11. In a case where the laser printer 100 is in the multicolor mode, the transfer belt 11 is rotated further so that a toner image of the next color is formed thereon after the transfer of the toner image of the first color. While the toner image of the second color is formed, the rotary developing device 12 is rotated by 90° so that the developing device which corresponds to the second color opposes the photosensitive drum 10, to prepare for the development of the electrostatic latent image for the second color.

After the transfer of the toner image of the first color, the photosensitive drum 10 is repeatedly subjected to the process of forming a latent image, process of developing the latent image, and process of transferring the developed image, to form the second, third, and fourth monochromatic toner images. Consequently, four monochromatic toner images, different in color, are sequentially layered on the transfer belt 11. While the first to third monochromatic toner images are layered upon the transfer belt 11, the transfer roller 13a is kept separated from the transfer belt 11. Then, the transfer roller 13a is placed in contact with the transfer belt 11 before the electrostatic image for the fourth color begins to be written.

Meanwhile, one of the sheets S in a sheet feeding-conveying device 103 is moved out of the sheet feeding-conveying device 103 in synchronism with the progression of the above described image forming operation, so that the sheet S arrives at the secondary transferring section at the same time as the arrival of the toner image on the photosensitive drum 10 at the secondary transferring section 13. Then, the toner image on the transfer belt 11 is transferred onto the sheet S by the secondary transfer roller 13a in the secondary transferring section 13. Then, the sheet S is conveyed to the fixing device 14. Then, the sheet S is subjected to heat and pressure by the fixing device 14. Consequently, the unfixed toner image on the sheet S is permanently fixed to the sheet S. After the fixation of the toner image to the sheet S as described above, the sheet S is discharged by the pair of discharge rollers 15 into the delivery tray 16, which is an integral part of the top wall of the printer main assembly 101.

Embodiment 1

Figure 2:
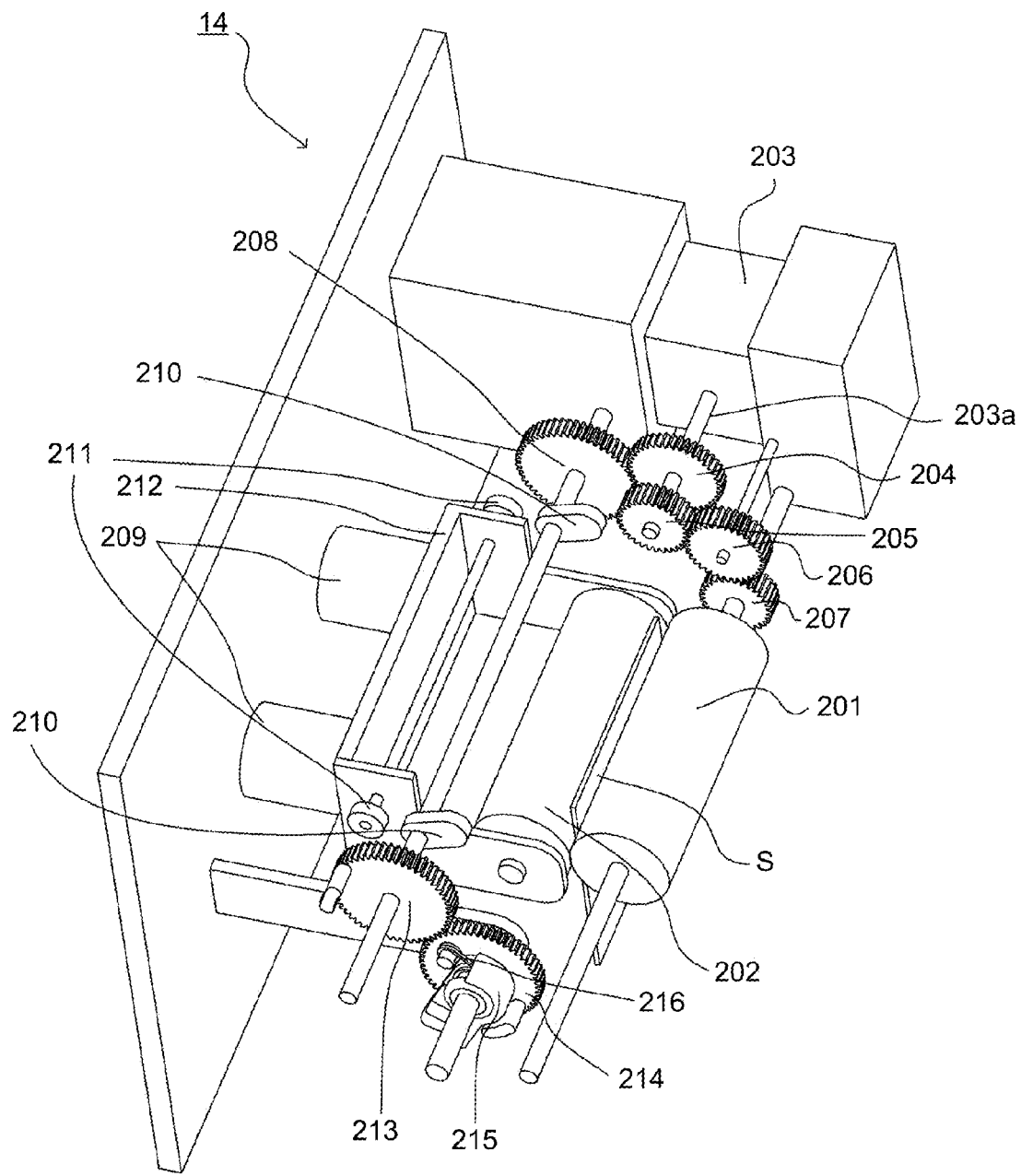
FIG. 2 is a perspective view of the fixing device in the first embodiment, in which a sheet of recording medium is being heated and pressed.
Figure 3:
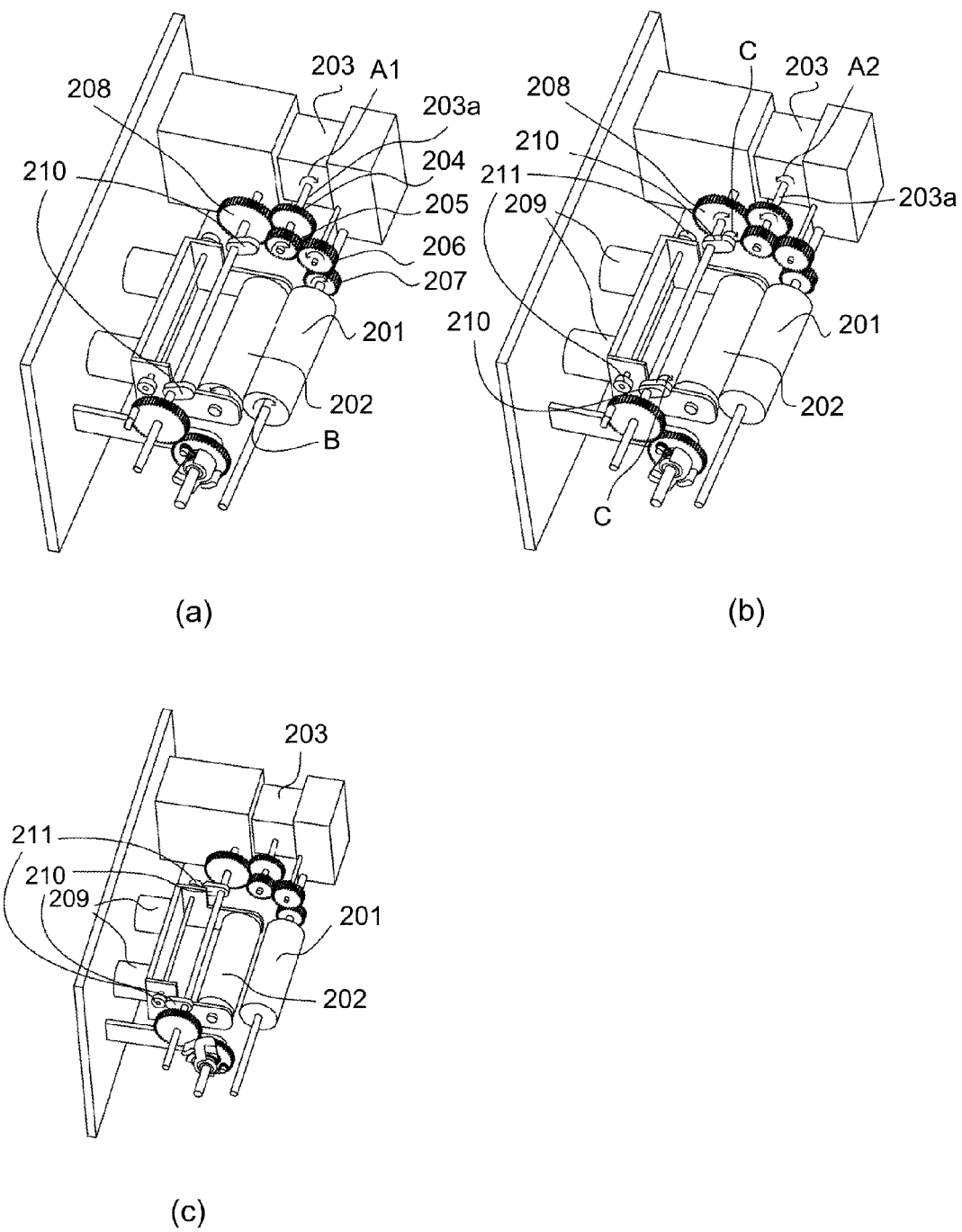
FIG. 3 is a drawing for describing the separation mechanism with which the driving force transmitting mechanism in this embodiment is provided.

Next, referring to FIGS. 2 and 3, the fixing device 14, and a driving force transmission mechanism used by the fixing device 14, are described. FIG. 2 is a perspective view of the fixing device 14 in the first embodiment, which is applying heat and pressure to a sheet S of recording medium. FIG. 3 is a drawing for describing the separation mechanism with which the driving force transmission mechanism in the first embodiment is provided. More specifically, FIG. 3(a) is a perspective view of the fixing device 14, when the pressure roller of the fixing device 14 is in contact with the heat roller of the fixing device 14. FIG. 3(b) is a perspective view of the fixing device 14 when the pressure roller has just begun to be separated from the heat roller. FIG. 3(c) is a perspective view of the fixing device 14 after the separation of the pressure roller from the heat roller.

Referring to FIG. 2, in the first embodiment, the driving force transmission mechanism employed by the fixing device 14 is made up of multiple gears which are rotatable by the driving force from a fixation motor 203. More concretely, the driving force transmission mechanism has: a rotational shaft 203a which is rotated by the driving force from the fixation motor 203 as a drive force source; a one-way gear 204 which is rotated by the rotation of the rotational shaft 203a; and a slave gear 205 which is attached to the rotational shaft 203a in such a manner that it becomes coaxial with the one-way gear 204. Further, the driving force transmission mechanism has: a slave gear 206 which is in mesh with the slave gear 205; and a slave gear 207 which is in mesh with the slave gear 206 and is attached to the rotational shaft of the heat roller 201 in such a manner that it becomes coaxial with the heat roller 201. Further, it has: a slave gear 208 which is in mesh with the one-way gear 204; a load bearing gear 213, as the first gear, which is coaxially attached to the shaft of the slave gear 208; and a load application gear 214, as the second gear, which is in mesh with the load bearing gear 213. Thus, the lead bearing gear 213 rotates by receiving the driving force from the fixation motor 203 through the rotational shaft 203a and one-way gear 204.

As the sheet S of recording medium, on which the toner image is present, is conveyed to the fixing device 14, it is moved into the nip which the heat roller 201 and pressure roller 202 of the fixing device 14 form. In the fixation nip, the sheet S is subjected to heat and pressure, whereby the unfixed toner image on the sheet S is permanently fixed to the sheet S. The fixing device 14 uses the driving force from the fixation motor 203 to rotationally drive the heat roller 201 through the rotational shaft 203a, and slave gears 205, 206, and 207. The pressure roller 202 is a slave roller to the heat roller 201. That is, it is rotated by the rotation of the heat roller 201. The temperature of the heat roller 201 is controlled by an unshown heater.

From the standpoint of usability, and also, the longevity of the printer main assembly 101, it is necessary for the pressure roller 202 to remain separated from the heat roller 201 while a jammed sheet of recording medium is removed and/or the electric power source of the printer main assembly 101 is off.

Next, the separation mechanism, which keeps the pressure roller 202 separated from the heat roller 201, is described.

The separation mechanism in this embodiment is provided with: a separation cam 210 as a pressure applying member; a separation cam follower 211, as a member to be pressed by the separation cam 210; a fixing device housing 21 which is integral with the separation cam follower 211; and a pressure application springs 209, as a pressure applying member, which applies pressure to the fixing device housing 212. The fixing device housing 212, which is a supporting member, rotatably supports the pressure roller 202.

The separation mechanism rotationally drives the separation cam 210 by receiving driving force from the fixation motor 203 through the rotational shaft 203a, one-way gear 204, and slave gear 208. The separation mechanism is structured so that it presses the separation cam follower 211 when the load bearing gear 213 (rotational shaft 203a) is in a preset position in terms of its rotational phase.

Both the separation cam follower 211 and pressure roller 202 (as second member) are held by the fixing device housing 212. The fixing device housing 212 is kept under the pressure from the pair of pressure application springs 209, and is movable toward the rotational axis of the heat roller 201 (as first member).

The distance between the rotational axis of the pressure roller 202 and the rotational axis of the heat roller 201 is changed by the rotational phase of the separation cam 210. That is, whether the pressure roller 202 is kept in contact with the heat roller 201 or not is determined by the rotational phase of the separation cam 210. More concretely, while the separation cam 210 is pressing the separation cam follower 211, the pressure roller 202 remains separated from the heat roller 201, whereas while the separation cam 210 is not pressing the separation cam follower 211, the pressure roller 202 presses on the heat roller 201.

In this embodiment, the separation cam 210 and load bearing gear 213 (as first gear) are coaxially attached to the same shaft. The load application gear 214 (as second gear) is in mesh with the load bearing gear 213. Further, a load application lever 215 and a load generation spring 216 are attached to the load bearing gear 214 (second gear). In this embodiment, a combination of the load application lever 215 and load generation spring 216 makes up the load applying member (braking member) in accordance with the present invention.

Referring to FIG. 3(a), as the rotational shaft 203a is rotated by the driving force from the fixation motor 203 in the direction by an arrow mark A1, the heat roller 201 is rotated in the direction indicated by an arrow mark B by the rotational force transmitted thereto through the slave gears 205, 206, and 207. Thus, a sheet S of recording medium (unshown) is conveyed through the nip which the rotating heat roller 201 and pressure roller 202 form. By the way, the separation mechanism in this embodiment is structured so that when the fixation motor 203 rotates in the direction A1, the driving force from the fixation motor 203 is not transmitted to the slave gear 208, and therefore, it does not occur that the separation cams 210 are rotationally driven.

When it is necessary for the pressure roller 202, which is in contact with the heat roller 201 as shown in FIG. 3(a), to be separated from the heat roller 201, the rotational shaft 203a is rotated in the direction indicated by an arrow mark A2 in FIG. 3(b), by the driving force from the fixation motor 203. As the rotational shaft 203a is rotated in the direction A2, the separation cam 210 rotates in the direction indicated by an arrow mark C. As the separation cam 210 rotates by a certain angle, it begins to press on the separation cam follower 211 against the pressure generated by the pressure application spring 209, causing thereby the pressure roller 202 to be separated by a preset distance from the heat roller 201 as shown in FIG. 3(c).

As the rotational shaft 203a, which is in the state shown in FIG. 3(c), is rotated further to rotate the separation cam 210 in the direction C, the pressure roller 202 comes back into contact with the heat roller 201 as shown in FIG. 3(a). During this portion of the rotational movement of the separation cam 210, which allows the pressure roller 202 to come back into contact with the heat roller 201, it sometimes occurs that the separation cam 210 is accelerated in its rotational movement, and therefore, the pressure roller 202 is allowed to abruptly come into contact with the heat roller 201, as if it collides with the heat roller 201, generating therefore a substantial amount of noises (collisional noises). In this embodiment, therefore, in order to minimize the collisional noises attributable to the abrupt contact (collision) between the pressure roller 202 and heat roller 201, the separation mechanism is structured so that braking torque, which is opposite in direction from the unintended acceleration of the separation cam 210, is applied to the load bearing gear 213 by the load generation spring 216 to cancel the torque which gives the separation cam 210 the unintended acceleration. This structural arrangement is the characteristic feature of the separation mechanism in this embodiment.

Figure 4:
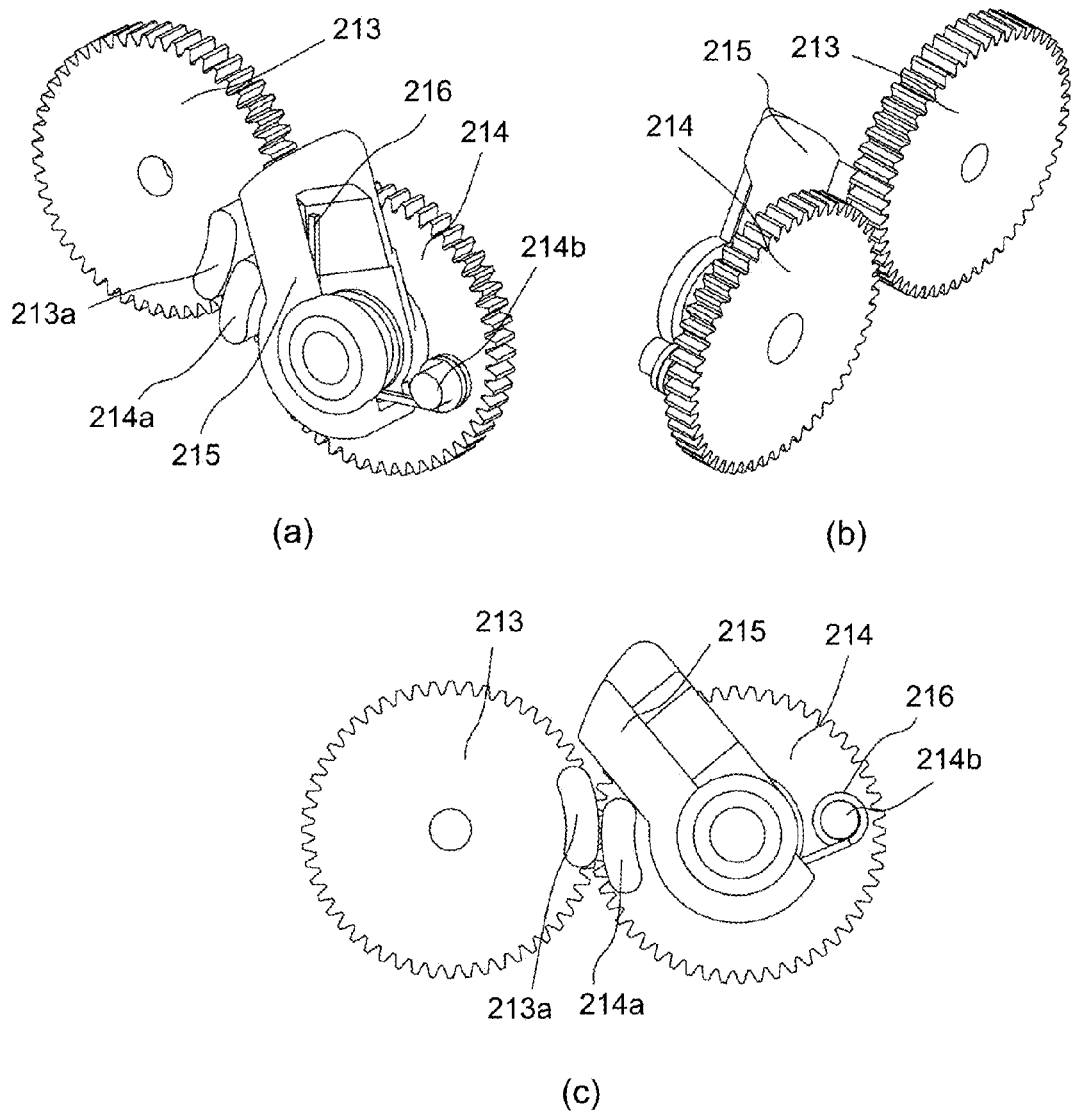
FIG. 4 is a drawing for showing the structure of the load applying gear, load bearing gear, and pressure application spring.

Next, referring to FIG. 4, the characteristic feature of the separation mechanism in this embodiment is described. FIG. 4 is a drawing for showing the structure of the load application gear, load bearing gear, and load generation spring. More specifically, FIG. 4(a) is a perspective view of the separation mechanism as seen from the load generation spring 216 side of the load application gear 214. FIG. 4(b) is a perspective view of the separation mechanism as seen from the opposite side of the load application gear 214 from the load generation spring 216. FIG. 4(c) is a plan view of the separation mechanism as seen from the load generation spring 216 side of the load application gear 214.

In the first embodiment, the load application lever 215 is coaxially attached to the same shaft as the load application gear 214. It internally holds the load generation spring 216 which is a torsion coil spring. The load application lever 215 is independent from the load application gear 214. That is, it is rotatable about the rotational axis of the load application gear 214, independently from the load application gear 214.

One end of the load generation spring 216 is fixed to the boss 214b (load generation spring anchoring portion) of the load application gear 214 (second gear), whereas the other end is rested on the load application lever 215 in a manner to cause the load application lever 215 to rotationally move about the rotational axis of the load application gear 214. The load application gear 214 and load bearing gear 213 are the same in the number of teeth. When the load application gear 214 and load bearing gear 213 are in their positions, in terms of rotational phase, shown in FIG. 4, the opposite edge of the load application lever 215 from the load generation spring 216 is in contact with the boss 214a of the load application gear 214.

When the separation mechanism is in the state shown in FIG. 4, the pressure generated by the load generation spring 216 remains within the confines of the load application gear 214. Therefore, the load (braking torque) generated by the load generation spring 216 is not applied to the load bearing gear 213. As the load application lever 215 is rotated to the position, in terms of rotational phase, at which it comes into contact with the boss 213a (load bearing portion) of the load bearing gear 213, the braking torque begins to be applied to the load bearing gear 213. The position of the boss 213a of the load bearing gear 213 relative to the load bearing gear 213 is such that the distance from the center of the load bearing gear 213 to the outward edge of the boss 213a is equal to the radius of the pitch circle of the load bearing gear 213.

Figure 5:
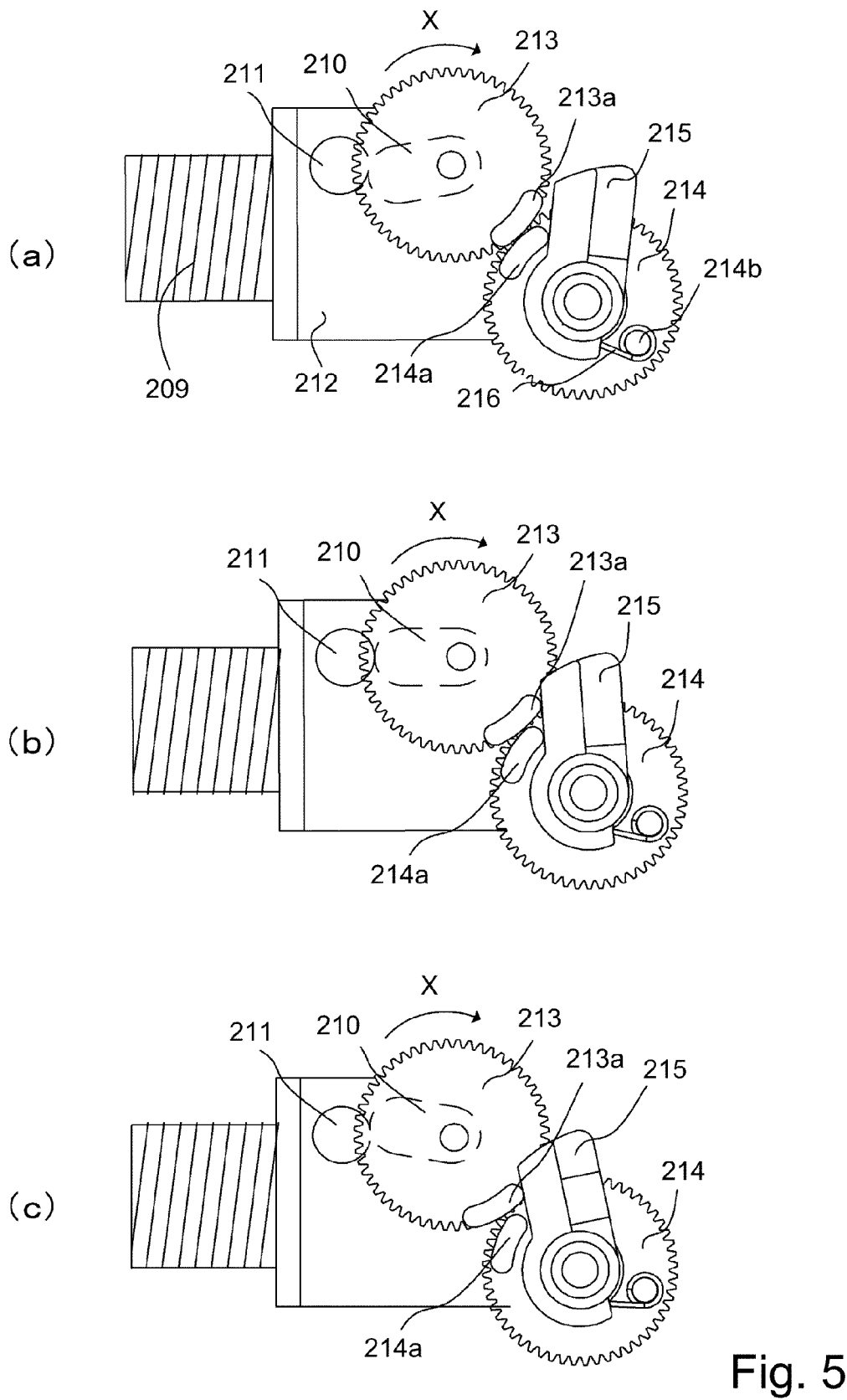
FIG. 5 is a drawing for describing the relationship between the lead applying gear, and separation cam.
Figure 6:
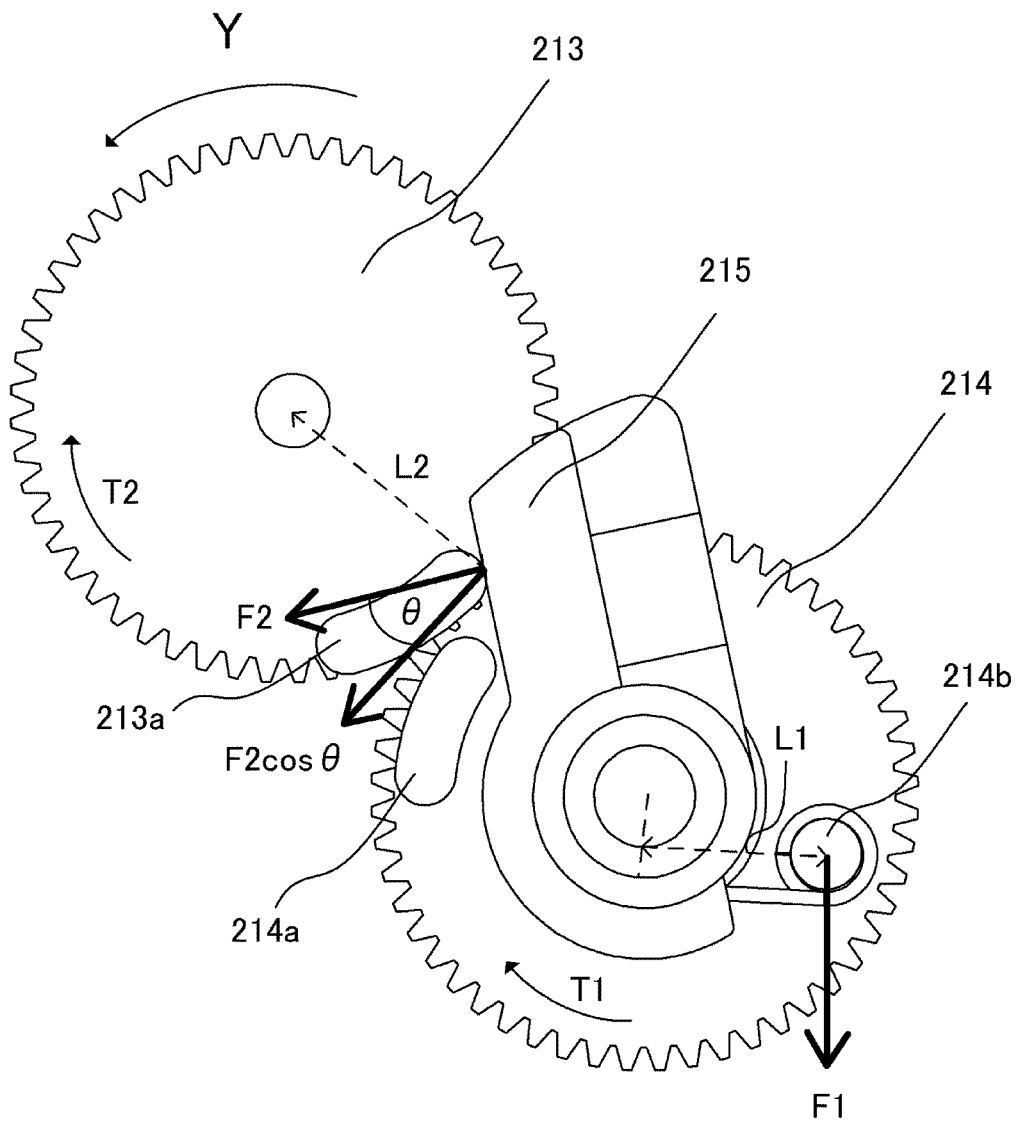
FIG. 6 is a drawing for describing the braking (load) torque generated by the separation mechanism in this embodiment.

Next, referring to FIGS. 5 and 6, the braking torque generated in this embodiment is described. FIG. 5 is a drawing for describing the relationship between the load bearing gear 213 and separation cam 210. It is a plan view of the separation mechanism as seen from the load application lever side of the mechanism. FIG. 5(a) shows the state of the separation mechanism immediately before the pressure roller 202 is made to separate from the heat roller 201. FIG. 5(b) shows the state of the separation mechanism when the pressure roller 202 is remaining separated from the heat roller 201. FIG. 5(c) shows the state of the separation mechanism immediately after the pressure roller 202, which was remaining separated from the heat roller 201, begins to be placed in contact with the heat roller 201. The separation mechanism is structured so that the separation cam 210 and load bearing gear 213 move together at the same speed. When the pressure roller 202 is placed in contact with, or separated from, the heat roller 201, both the separation cam follower 211 and load bearing gear 213 rotate in the direction indicated by an arrow mark X.

When the separation mechanism is in the state shown in FIG. 5(a), that is, immediately before the pressure roller 202 begins to be separated from the heat roller 201, the load application lever 215 is not in contact with the boss 213a of the load bearing gear 213. Thus, the load bearing gear 213 is yet to be affected by the braking torque. That is, while the pressure roller 202, which remained in contact with the heat roller 201, begins to be separated from the heat roller 201, the load bearing gear 213 is not subjected to the braking torque by the load application gear 214.

Referring to FIG. 5(b), when the pressure roller 202 is separated by the largest distance from the heat roller 201, the load application lever 215 is in contact with both the boss 214a of the load application gear 214, and the boss 213a of the load bearing gear 213. Thus, the load bearing gear 213 is yet to be subjected to the braking torque, because the load application lever 215 is still in contact with the boss 214a of the load application gear 214.

Next, referring to FIG. 5(c), immediately after the pressure roller 202, which was kept separated from the heat roller 201, begins to be moved toward the heat roller 201, the opposite end edge of the load application lever 215 from the load generation spring 216, is in contact with only the boss 213a of the load bearing gear 213. Thus, the torsion coil spring 216 is wound by the boss 214b of the load application gear 214 and the boss 213a of the load bearing gear 213. As a result, the load bearing gear 213 is subjected to the force (braking torque) generated by the resiliency of the torsion coil spring 216. Next, referring to FIG. 6, the relationship among the force applied to the boss 214b of the load application gear 214, force applied to the boss 213a of the load bearing gear, and braking torque is described.

Referring to FIG. 6, there are generated torques T1 and T2 at the point of contact between the load application gear 214 and load bearing gear 213. The amount of the torque T1 is the product of multiplication between a force F1, which is generated at the point of contact between the load generation spring 216, and the boss 214b of the load application gear 214, and the length L1 of the arm portion of the load generation spring 216. As for the amount of torque T2, it is the product of the multiplication between (F2×cos θ), which is the circumferential component of the force by which the load application lever 215 presses on the boss 213a of the load bearing gear 213, and the distance L2 between the center of the load bearing gear 213 and the point of contact between the boss 213a of the load bearing gear 213, and the load application lever 215.

The effective amount of the braking torque to which the load bearing gear 213 is subjected is the difference between the torques T1 and T2, because the torques T1 and T2 are opposite in direction from each other. When the separation mechanism is in the state shown in FIGS. 5(c) and 6, the load application lever 215 is in contact with the boss 213a of the load bearing gear 213, and applies a force F2 to the load bearing gear 213. The angle between the direction of the force F2 and the rotational direction of the load bearing gear 213 is θ. Therefore, the torque T2 is reduced by an amount equivalent to the angle θ. Thus, the torque T1 remains greater than the torque T2. Therefore, the load bearing gear 213 remains subjected to the braking torque, which is generated in the direction indicated by an arrow mark Y, which is opposite from the direction of the unintended cam acceleration.

When the separation mechanism is in the state shown in FIG. 5(c), torque is generated in the direction indicated by the arrow mark X, and therefore, the unintended cam acceleration does not occur. Thus, the unintended cam acceleration can be cancelled by the actual amount of braking torque, which is the difference between above described torques T1 and T2, which applies in the direction indicated by the arrow mark Y in FIG. 6.

Figure 7:
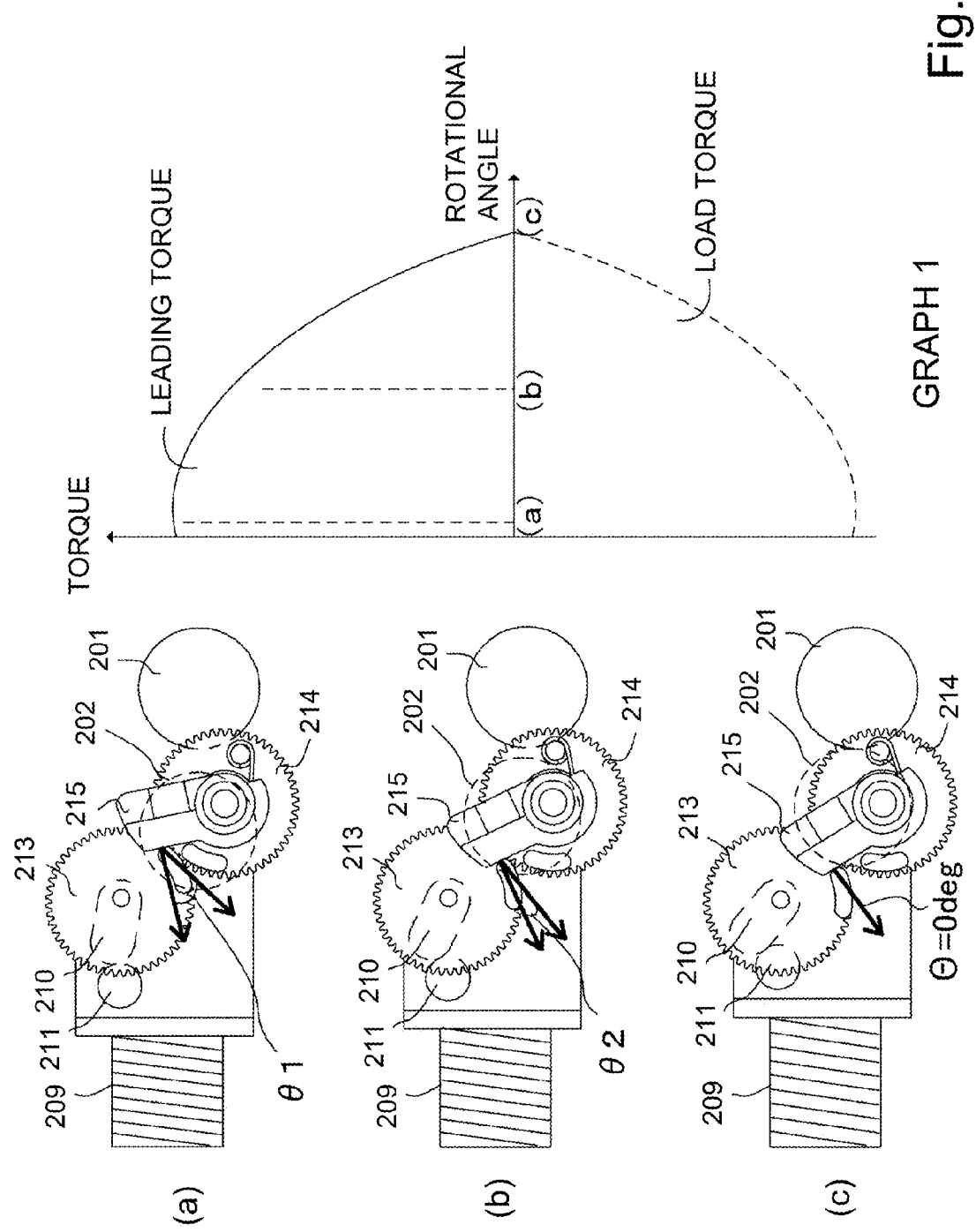
FIG. 7 is a drawing for describing the change in the amount of the unintended acceleration (leading) torque and the amount of braking torque.

However, the amount of the unintended cam acceleration torque to which the separation cam 210 is subjected changes according to the rotational phase (angle) of the separation cam 210. Thus, the amount of the braking torque has also to be changed according to the rotational phase of the separation cam 210. FIG. 7 shows the change in the amount of the unintended cam acceleration torque to which the separation cam 210 is subjected, and the change in the necessary amount of the braking torque. FIG. 7 is a drawing for describing the change in the unintended cam acceleration torque and the change in the necessary amount of braking torque. More specifically, FIG. 7(a) shows the positional relationship, in terms of rotational phase, among the separation cam 210, boss 213a of the load bearing gear 213, boss 214a of the load application gear 214, and load application lever 215, right after the pressure roller 202 began to separate from the heat roller 201. FIG. 7(b) shows the relationship, while the pressure roller 202 is moving away from the heat roller 201. FIG. 7(c) shows the relationship when the pressure roller 202 is back in contact with the heat roller 201 after being separated from the heat roller 201. A graph 1, which is in the right side of FIG. 7, shows the amount of the unintended cam acceleration torque, to which the separation cam 210 is subjected.

When the separation mechanism is in the state shown in FIG. 7(a), the amount of the pressure generated by the compression springs 209 is high. Therefore, the unintended cam acceleration torque is large. However, it gradually reduces as the distance between the pressure roller 202 and heat roller 201 reduces. In this embodiment, the separation mechanism is structured so that as the distance between the pressure roller 202 and heat roller 201 reduces, the angle θ reduces. An angle θ1 shown in FIG. 7(b) is smaller in value than an angel θ1 shown in FIG. 7(a). The smaller the angle θ, the smaller the braking torque. That is, the separation mechanism is structured so that as the distance between the pressure roller 202 and heat roller 201 reduces, the braking torque reduces, and also, so that as the pressure roller 202 comes into contact with the heat roller 201 as shown in FIG. 7(c), the angle θ becomes zero (θ=0 deg). Therefore, the torques T1 and T2 shown in FIG. 6 become equal, and therefore, there is generated no braking torque to which the load bearing gear 213 is subjected.

As described above, in the case of the separation mechanism in the first embodiment, the unintended cam acceleration torque is cancelled by providing the separation cam 210 (load bearing gear 213) with such braking torque that is opposite in direction from the unintended cam acceleration torque and equal in value. With the separation mechanism being structured as described above, it is possible to minimize the noises attributable to collisional contact between the pressure roller 202 and heat roller 201, which is caused by the unintended acceleration of separation cam rotation. Further, the separation mechanism is structured so that whether or not the braking torque is applied is dependent upon the rotational phase of the separation cam 210 (load bearing gear 213). Therefore, the braking torque always begins to be applied at a preset rotational phase of the separation cam 210, and also, the amount of braking torque is dependent upon the rotational phase of the separation cam 210. Therefore, it is ensured that the braking torque is always applied by a proper amount. Further, because the braking torque is generated by the force of the torsion coil spring 216 through the gears, the separation mechanism in this embodiment has a merit of being small in the amount by which the braking torque is affected by the change in ambience and/or cumulative usage of the fixing device 14.

By the way, in the first embodiment, the load bearing gear 213 and load application gear 214 are the same in tooth count. However, they do not need to be the same in tooth count. That is, the tooth count of the former may be multiple of the tooth count of the latter. By making the tooth count of the former a multiple of the tooth count of the latter, it is possible to generate a large amount of braking torque with the use of a braking torque generation spring (torsion coil spring) which is relatively small in the amount of resiliency.

Embodiment 2

Figure 8:
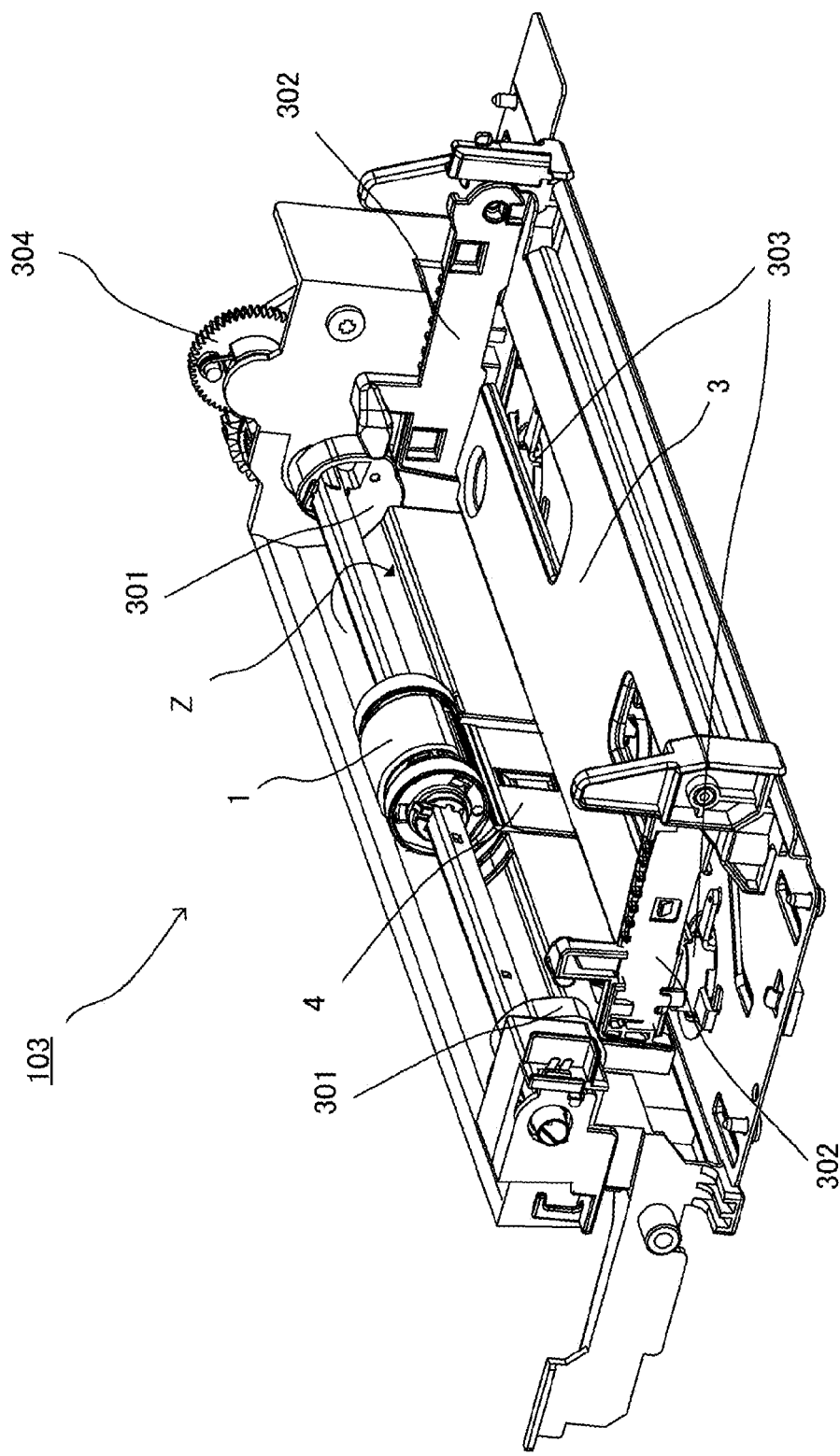
FIG. 8 is a perspective view of the sheet feeding-conveying device in the second embodiment of the present invention.
Figure 9:
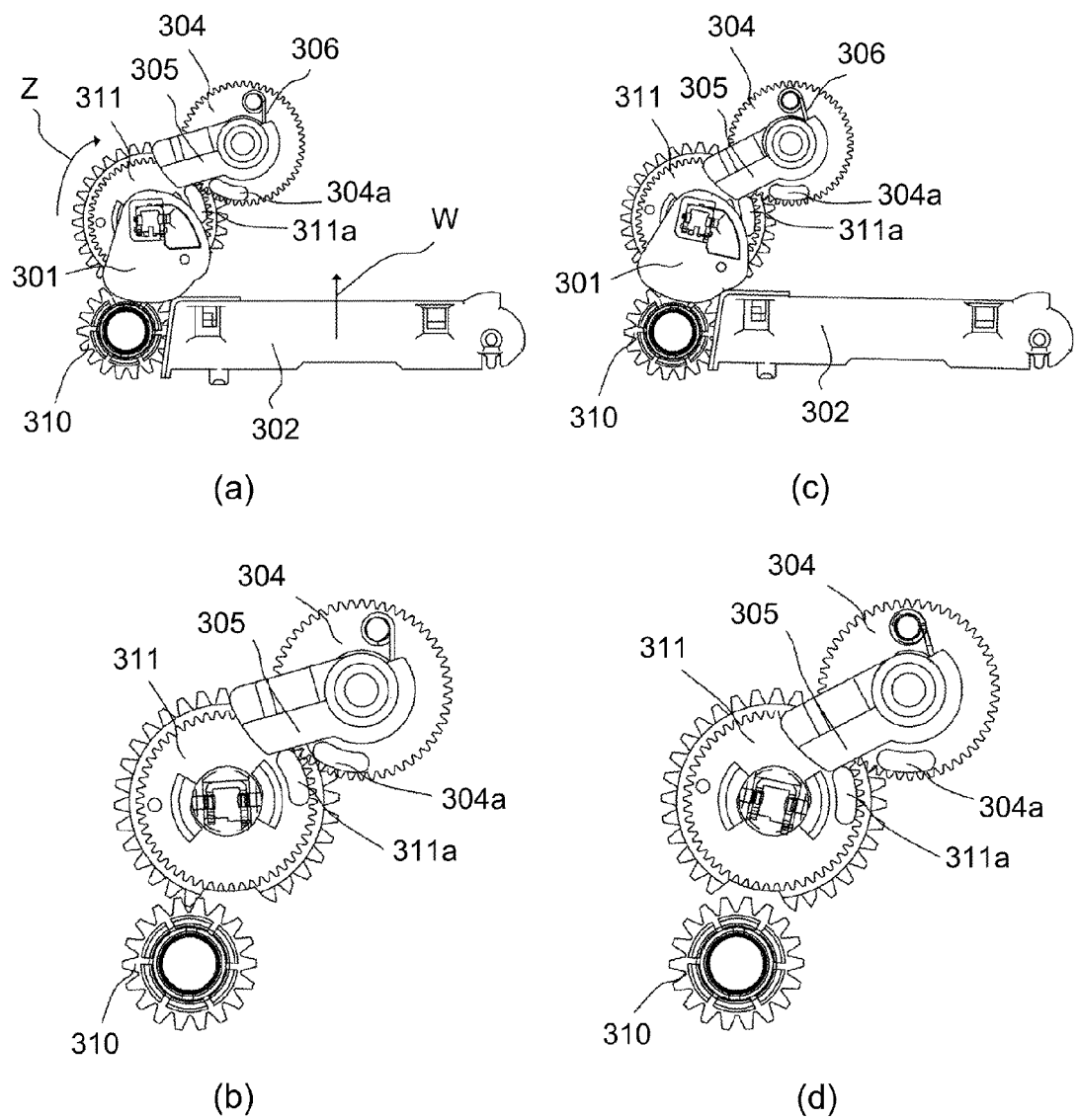
FIG. 9 is a drawing for describing the separation mechanism in the second embodiment.
Figure 10:
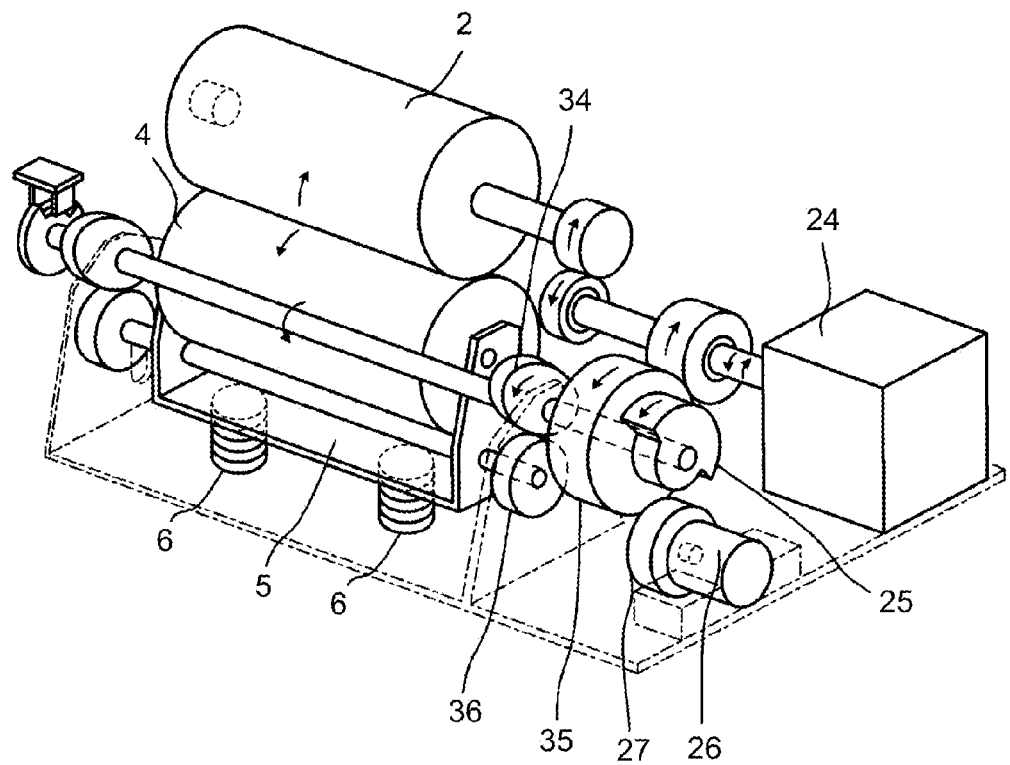
FIG. 10 is a perspective view of an example of conventional fixing device.
Figure 11:
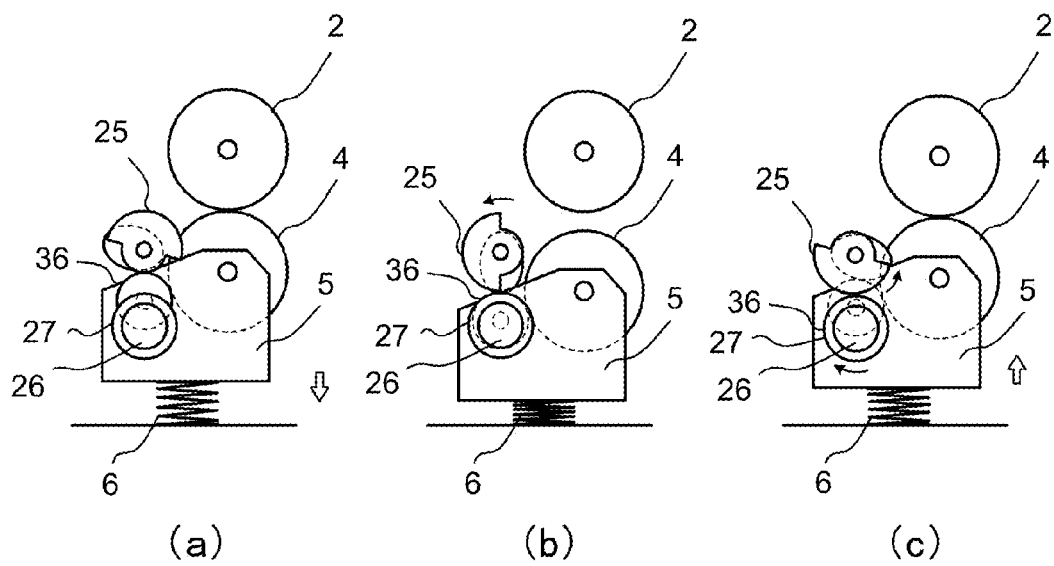
FIG. 11 is a drawing for describing the separation mechanism of the conventional fixing device.

Next, referring to FIGS. 8 and 9, the second embodiment of the present invention is described. FIG. 8 is a perspective view of the sheet feeding-conveying device in the second embodiment. FIG. 9 is a drawing for describing the separation mechanism in the second embodiment. More specifically, FIG. 9(a) shows the state of the sheet feeding-conveying device in the second embodiment immediately before the feeding-conveying roller 1 moves back into the state shown in FIG. 8 after one full rotation. FIG. 9(b) is a plan view of the separation mechanism in this embodiment, shown in FIG. 9(a), minus the sheet feeding-conveying cam. FIG. 9(c) is a plan view the separation mechanism in this embodiment, shown in FIG. 9(a), minus the sheet feeding-conveying cam, which is in the same state as the state shown in FIG. 8.

In the second embodiment, a sheet feeding-conveying cam 301 is used as a pressing member for positioning the partially toothless gear of the sheet feeding-conveying device 103. It is used to prevent the partially toothless gear 311 (first gear) from being unintentionally accelerated in rotational speed.

Referring to FIG. 8, the sheet feeding-conveying device in the second embodiment has: a feeding-conveying roller 1 as the first member; a center plate (second member) which supports the sheets (of recording medium) in the sheet feeding-conveying device 103; and a pair of center plate springs 303 which keep the sheets in the sheet feeding-conveying device 103 pressed against the sheet feeding-conveying roller 1. Next, referring to FIG. 9, the driving force transmitting mechanism employed by the sheet feeding-conveying device 103 has: a slave gear 310; a partially toothless gear 311 as the first gear; and a load bearing gear 304 as the second gear. The slave gear 310 which receives the driving force from the sheet feeding motor (unshown driving force source) transmits the driving force to the partially toothless gear 311, whereby the partially toothless gear 311 is rotated.

The sheet feeding-conveying roller 1 is rotated by the unshown sheet feeding-conveying motor in the direction indicated by an arrow mark Z in FIG. 9 while being controlled in its rotation by the partially toothless gear 311. The sheet feeding cam 301 is on the same shaft as the sheet feeding-conveying roller 1. The center plate 3 is integral with a sheet feeding cam follower 302, which remains pressured toward the sheet feeding-conveying roller 1 by the sheet feeding cam 301. The position of the center plate 3 is controlled by the sheet feeding-conveying cam follower 302 fixed to the sheet feeding cam 301 and center plate 3.

Thus, as the sheet feeding roller 1 rotates, the sheet feeding cam 301 also rotates with the sheet feeding roller 1, controlling thereby the center plate 3. When the rotational shaft (partially toothless gear 311) is in a preset position in terms of its rotational phase, the sheet feeding cam 301 presses on the sheet feeding cam follower 302. However, the sheets on the center plate 3 are yet to come into contact with sheet feeding roller 1.

The second embodiment can prevent the sheet feeding-conveying device 103 from generating the collisional noises when the sheet feeding-conveying roller 1 moves back into the position shown in FIG. 8. Next, referring to FIG. 9, how the sheet feeding-conveying device 103 can be prevented from generating the above described collisional noises is described.

The rotation of the partially toothless gear 311 and the rotation of the sheet feeding roller 1 are controlled by reception of the driving force from the unshown sheet feeding motor by the slave gear 310, and the transmission of the driving force from the slave gear 310 to the partially toothless gear 311. The partially toothless gear 311 rotates in the direction indicated by the arrow mark Z like the sheet feeding-conveying roller 1. At this point in operation, the sheet feeding cam follower 302 is kept pressed by the resiliency of the center plate springs 303 in the direction W. Therefore, when the sheet feeding-conveying device 103 is in the state shown in FIG. 9(a), torque is generated in the direction Z, that is, the direction to unintentionally accelerate the sheet feeding cam 301.

When the state of the sheet feeding cam 301 changes from the one shown in FIG. 9(a) to the one shown in FIG. 9(c), that is, when the state of the sheet feeding cam 301 changes from the one in which its sheet feeding cam 301 presses on the sheet feeding cam follower 302, to the one in which the sheet feeding cam 301 is in the recess of the sheet feeding cam follower 302, the driving force is not transmitted to the partially toothless gear 311 from the slave gear 310. By the way, in the second embodiment, as the sheet feeding cam 301 fits into the recess of the sheet feeding cam follower 302, it stops pressing on the sheet feeding cam follower 302.

Thus, it sometimes occurs that when the sheet feeding cam 301 is in the state shown in FIG. 9(a), it abruptly begins to rotate at a high speed, and is abruptly stopped as it rotates to the position shown in FIG. 9(c). Therefore, the sheet feeding-conveying device 103 sometimes generates collisional noises. Thus, the collisional noises are minimized by the generating braking torque in the opposite direction from the direction Z with the use of the load generation spring 306 as in the first embodiment. The load application gear 306 is positioned so that it can mesh with the partially toothless gear 311. The braking torque is generated by a combination of the load application lever 305 and load generation spring 306. The structural arrangement for generating the braking torque which is opposite in direction from the unintended cam acceleration is the same as the one in the first embodiment. Therefore, its detailed description is not given here. The section of the sheet feeding-conveying device 103 in the second embodiment, which is made up of the load application lever 305 and load generation spring 306 is the load applying member (braking torque applying member) in accordance with the present invention.

Unlike the first embodiment, in the second embodiment, a torque which is slightly weaker than the unintended cam acceleration torque is applied in the opposite direction from the direction Z. While the state of the sheet feeding-conveying device 103 changes from the one shown in FIG. 9(a) to the one shown in FIG. 9(c), the driving force from the sheet feeding motor, cannot be received by the slave gear 310 until the sheet feeding cam 301 rotates to the position shown in FIG. 8. Thus, by applying braking torque which is slightly weaker than the unintended sheet feeding cam acceleration torque, in the opposite direction from the direction Z, not only is it possible to properly position the partially toothless gear 311, but also, to minimize the collisional noises attributable to the positioning of the partially toothless gear 311. As described above, the present invention makes it possible to reliably control the unintended cam acceleration which occurs to the mechanism which employs a partially toothless gear, to minimize the collisional noises, as in the first embodiment.

By the way, in the preceding embodiments of the present invention, the separation mechanism in accordance with the present invention was employed by the fixing device 14 and sheet feeding-conveying device 103. However, the preceding embodiments are not intended to limit the present invention in scope. That is, the present invention is applicable to other sections of the image forming apparatus 100 than those described above. For example, the separation mechanism in accordance with the present invention may be employed to separate the two components which form the transfer nip, from each other. That is, it may be employed to separate a transferring member such as the secondary transfer roller 13a (secondary member) from the image bearing member such as the transfer belt 11 (first member). Moreover, it may be employed to separate the two components which make up the developing section. That is, it may be employed to separate a developing member such as the rotary developing device 12 (second member) from the photosensitive drum 10 (first member).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 016893/2014 filed Jan. 31, 2014, which is hereby incorporated by reference.

What is claimed is:

1. A spacing mechanism comprising:
    a first member;
    a second member urged toward said first member;
    a rotation shaft rotatable by a driving force from a driving source;
    an urged member supported by said second member;
    an urging member for receiving the driving force from said rotation shaft to rotate, said urging member urging said urged member, against an urging force, toward said first member to space said second member from said first member, in a state that said rotation shaft is at a predetermined rotational phase;
    a first gear that is rotatable integrally with said urging member;
    a load receiving portion that is rotatable integrally with said first gear;
    a second gear engaged with said first gear to be driven by said first gear; and
    an elastic unit having one end portion fixed to a fixed portion of said second gear and another end portion configured to contact said load receiving portion,
    wherein, when said rotation shaft rotates from the predetermined rotational phase and said urged member is released from said urging member, said elastic unit applies a load to said first gear in a direction opposite to a direction in which said first gear rotates by receiving the driving force.

2. A mechanism according to claim 1, wherein said elastic unit includes a coil spring which is compressed between the fixed portion and said load receiving portion when said urged member is released from said urging member.

3. A mechanism according to claim 2, wherein a number of teeth of said first gear is an integer multiple of that of said second gear.

4. A mechanism according to claim 1, wherein said urging member includes a cam, and said urged member includes a cam follower provided on a supporting member supporting said second member.

5. A fixing device for pressing a recording material to fix an image on a recording material, said fixing device comprising:
    a first rotatable member;
    a second rotatable member for cooperating with said first rotatable member to form a nip for nipping the recording material, said second rotatable member being urged to said first rotatable member;
    a rotation shaft rotatable by a driving force from a driving source;
    a support member for supporting said second rotatable member;
    an urged member supported by said support member;
    an urging member for receiving the driving force from said rotation shaft to rotate, said urging member urging said urged member against an urging force toward said first rotatable member to space said second rotatable member from said first rotatable member, in a state that said rotation shaft is at a predetermined rotational phase;
    a first gear that is rotatable integrally with said urging member;
    a load receiving portion that is rotatable integrally with said first gear;
    a second gear engaged with said first gear to be driven by said first gear; and
    an elastic unit having one end portion fixed to a fixed portion of said second gear and another end portion configured to contact said load receiving portion,
    wherein, when said rotation shaft rotates from the predetermined rotational phase and said urged member is released from said urging member, said elastic unit applies a load to said first gear in a direction opposite to a direction in which said first gear rotates by receiving the driving force.

6. A device according to claim 5, wherein said elastic unit includes a coil spring which is compressed between the fixed portion and said load receiving portion when said urged member is released from said urging member.

7. A device according to claim 6, wherein a number of teeth of said first gear is an integer multiple of that of said second gear.

8. A device according to claim 5, wherein said urging member includes a cam, and said urged member includes a cam follower provided on said supporting member.

9. A feeding device for feeding a recording material, said device comprising:
- a rotatable feeding member for feeding the recording material;
- a supporting member for supporting the recording material, said supporting member being urged toward said feeding member to feed the recording material by rotation of said feeding member in a state that the recording material is nipped between said supporting member and said feeding member;
- a rotation shaft rotatable by a driving force from a driving source;
- an urged member supported by said supporting member;
- an urging member for receiving the driving force from said rotation shaft to rotate, said urging member urging said urged member against an urging force toward said feeding member to move said supporting member away from said feeding member, in a state that said rotation shaft is at a predetermined rotational phase;
- a first gear that is rotatable integrally with said urging member;
- a load receiving portion that is rotatable integrally with said first gear;
- a second gear engaged with said first gear to be driven by said first gear; and
- an elastic unit having one end portion fixed to a fixed portion of said second gear and another end portion configured to contact said load receiving portion, wherein, when said rotation shaft rotates from the predetermined rotational phase and said urged member is released from said urging member, said elastic unit applies a load to said first gear in a direction opposite to a direction in which said first gear rotates by receiving the driving force.

10. An apparatus according to claim 9, wherein said urging member includes a cam, and said urged member includes a cam follower.

11. An apparatus according to claim 9, wherein said elastic unit includes a coil spring which is compressed between the fixed portion and said load receiving portion when said urged member is released from said urging member.

12. An apparatus according to claim 11, wherein said elastic unit further includes a load application member, and when said urged member is released from said urging member, said load application member contacts said load receiving portion and is positioned between said load receiving portion and one end of said coil spring.

13. An apparatus according to claim 2, wherein said elastic unit further includes a load application member, and when said urged member is released from said urging member, said load application member contacts said load receiving portion and is positioned between said load receiving portion and one end of said coil spring.

14. An apparatus according to claim 6, wherein said elastic unit further includes a load application member, and when said urged member is released from said urging member, said load application member contacts said load receiving portion and is positioned between said load receiving portion and one end of said coil spring.

* * * * *